(12) United States Patent
Higgs et al.

(10) Patent No.: US 10,078,739 B1
(45) Date of Patent: Sep. 18, 2018

(54) COMPELLING DATA COLLECTION VIA RESIDENT MEDIA DEVICES IN CONTROLLED-ENVIRONMENT FACILITIES

(71) Applicant: Securus Technologies, Inc., Dallas, TX (US)

(72) Inventors: Joseph Higgs, Fort Worth, TX (US); Luke Keiser, Frisco, TX (US)

(73) Assignee: Securus Technologies, Inc., Carrollton, TX (US)

( * ) Notice: Subject to any disclaimer, the term of this patent is extended or adjusted under 35 U.S.C. 154(b) by 948 days.

(21) Appl. No.: 14/504,313

(22) Filed: Oct. 1, 2014

(51) Int. Cl.
G06F 15/173 (2006.01)
G06F 21/31 (2013.01)
G06F 17/24 (2006.01)

(52) U.S. Cl.
CPC ............ *G06F 21/31* (2013.01); *G06F 17/243* (2013.01)

(58) Field of Classification Search
CPC .............................. G06F 21/31; G06F 17/243
USPC .......................................................... 709/224
See application file for complete search history.

(56) References Cited

U.S. PATENT DOCUMENTS

| | | | |
|---|---|---|---|
| 6,195,698 B1 * | 2/2001 | Lillibridge | G06F 21/31 709/203 |
| 7,257,557 B2 * | 8/2007 | Hulick | G09B 5/00 380/2 |
| 7,263,497 B1 * | 8/2007 | Wiser | G06Q 20/3829 705/26.8 |
| 7,383,233 B1 * | 6/2008 | Singh | G06Q 30/06 705/80 |
| 7,925,539 B1 * | 4/2011 | Singh | G06Q 30/0601 235/376 |
| 8,024,808 B1 * | 9/2011 | Gleichauf | H04L 47/762 713/153 |
| 8,219,021 B2 * | 7/2012 | Rogers | G06Q 50/205 434/323 |
| 9,055,048 B2 * | 6/2015 | Shepherd | G06F 21/62 |

(Continued)

OTHER PUBLICATIONS

Agarwal, Nitin. "Troubleshoot: Cannot log on to Windows 8/7". Apr. 23, 2010. pp. 1-3.*

(Continued)

*Primary Examiner* — Imad Hussain
(74) *Attorney, Agent, or Firm* — Fogarty LLP

(57) ABSTRACT

A controlled environment facility resident may initiate submission of data to a controlled-environment facility management system using a resident media device, and some time thereafter, access to the resident media device may be restricted by the controlled-environment facility management system to submission of data, until the resident completes submission of all data required for the submission. A controlled-environment facility management system may present a controlled-environment facility resident a data collection task to be completed by the resident and may restrict access to the resident media device in an escalating manner, until the resident completes the data collection task. The controlled-environment facility management system may also request further data from the resident, in response to the resident submitting initial data and may again restrict access to the resident media device in an escalating manner, unßtil the resident completes submission of further data.

27 Claims, 4 Drawing Sheets

(56) References Cited

U.S. PATENT DOCUMENTS

| | | | | |
|---|---|---|---|---|
| 2001/0039571 | A1* | 11/2001 | Atkinson | G06Q 30/02 709/217 |
| 2002/0169822 | A1* | 11/2002 | Packard | G09B 7/00 709/203 |
| 2004/0229199 | A1* | 11/2004 | Ashley | G09B 7/00 434/323 |
| 2005/0026130 | A1* | 2/2005 | Crowhurst | G09B 7/02 434/362 |
| 2005/0095571 | A1* | 5/2005 | Miller | G09B 7/02 434/350 |
| 2005/0235144 | A1* | 10/2005 | Jacobs | H04L 63/083 713/165 |
| 2006/0287874 | A1* | 12/2006 | Askeland | G06Q 30/02 705/1.1 |
| 2007/0011015 | A1* | 1/2007 | Alkalay | G06Q 10/00 705/35 |
| 2007/0117083 | A1* | 5/2007 | Winneg | G09B 7/00 434/350 |
| 2007/0214014 | A1* | 9/2007 | Suwalski | G06F 19/3456 705/3 |
| 2007/0239516 | A1* | 10/2007 | Smith | G06Q 10/10 705/7.32 |
| 2008/0294640 | A1* | 11/2008 | Yost | G06F 17/30029 |
| 2009/0217356 | A1* | 8/2009 | Scott | G06F 21/604 726/4 |
| 2010/0088740 | A1* | 4/2010 | Waters | G06F 21/577 726/1 |
| 2011/0204142 | A1* | 8/2011 | Rao | G06Q 10/06 235/380 |
| 2011/0257992 | A1* | 10/2011 | Scantland | G06Q 10/10 705/2 |
| 2012/0209621 | A1* | 8/2012 | Green | G06Q 10/00 705/2 |
| 2012/0244508 | A1* | 9/2012 | Katz | G09B 7/00 434/362 |
| 2013/0209982 | A1* | 8/2013 | Rooks | G09B 7/00 434/350 |
| 2013/0262333 | A1* | 10/2013 | Wicker | G06Q 50/265 705/325 |
| 2014/0067586 | A1* | 3/2014 | Geisen | G06Q 30/0611 705/26.4 |
| 2014/0222995 | A1* | 8/2014 | Razden | G09B 7/02 709/224 |
| 2015/0089345 | A1* | 3/2015 | Marimuthu | G06F 17/243 715/221 |
| 2017/0046804 | A1* | 2/2017 | Slay | G06Q 40/00 |

OTHER PUBLICATIONS

Respondus. "Respondus Lockdown Browser". Aug. 6, 2013. pp. 1-2.*

Jovanovic, Janko. "Web Form Validation: Best Practicses and Tutorials". Jul. 7, 2009. pp. 1-22.*

Stack Overflow. "Keeping submit button disabled until dynamically created required fields are filled". Oct. 17, 2013. pp. 1-2. (Year: 2013).*

* cited by examiner

US 10,078,739 B1

COMPELLING DATA COLLECTION VIA RESIDENT MEDIA DEVICES IN CONTROLLED-ENVIRONMENT FACILITIES

TECHNICAL FIELD

The present disclosure relates generally to use of resident media devices in controlled-environment facilities, more particularly to completion of data collection in controlled-environment facilities using resident media devices, and specifically to compel collection of data, via resident media devices, in controlled-environment facilities.

BACKGROUND

Completion of forms and similar paperwork is an everyday requirement in controlled-environment facilities. Typically these processes are more-or-less manual in nature, or at least require direct interfacing between controlled environment facility residents and facility personnel. However, in many (types) of controlled-environment facilities access to residents is limited. For example, in a correctional facility, it may be burdensome for a facility staffer to gain access to an inmate or detainee, requiring intervention of a guard, or similar personnel, to accompany the staffer to go speak with the inmate or to bring the inmate to the staffer and guard the inmate while being interviewed. Hence, typically in many (types) of controlled-environment facilities, most staff do not have direct access to residents.

Many forms, processes, and the like are resident initiated. In a correctional institution environment, such forms may be referred to as "kites." Inmate kites are a written form of communication that may be used to make requests for medical treatment, with respect to property issues, housing concerns and used as a form of communication with the court system (probation, courts, pre-trial services). A kite system may allow an inmate to contact a District Attorney's Office, Public Defender, Probation Department, the Judge or the Clerk of a Court. In such cases, the inmate is provided a kite that will be routed through the legal system. An electronic kite system similar to an Automated Teller Machine (ATM) may send requests to an appropriate location, electronically. This allows the inmate to send their concern or request directly to the appropriate facility unit or staff member. This also allows an accurate accounting of responses already provided to the inmates. In turn, the inmate can view their responses on the ATM-like kiosks located in their housing unit. Hence, medical requests or complaints may be initiated by a resident and presented (more-or-less) directly to a medical provider. In the case of grievances, or the like, after an initial review by controlled-environment facility personnel, the form may need to be sent back to the resident for further input. In other cases a requestor may require a resident to fill out a report. For example, facility staff might need a resident to fill out (portions of) an incident report or the like. Typically, there is nothing to compel the resident to respond to the request. In a correctional facility environment, one can appreciate that forcing compliance could quickly become an involved process, requiring intervention of correctional officers and the like to threaten punishment for non-compliance and/or to enforce any such punishment. Still, staffers typically have a responsibility to move processes forward. For example, medical personnel may have a particular obligation to show progress in treatment of a resident patient, requiring a higher level of follow-up, calling for in-person visits if progress is not shown. As noted, such visits may be challenging in correctional facility environments, and the like.

SUMMARY

The present invention is directed to systems and methods for compelling data collection of data from controlled-environment facility residents. Controlled-environment facility resident data collection system and method embodiments may employ controlled-environment facility resident media devices and a controlled-environment facility management system. The resident media device may be a computing device, which may be adapted and/or approved for use in the controlled-environment facility. The resident media device may, in accordance with various embodiments, be a tablet computing device, media player, kiosk, telephone, video device, or the like. Each respective resident media device may accept data from a respective controlled-environment facility resident to initiate a data submission to the controlled-environment facility management system by the resident and forward the data to the controlled-environment facility management system. The controlled-environment facility management system may determine whether the resident has submitted all data required for the data submission, and, in response to a determination that additional data is needed to complete the data submission, may request additional data needed to complete the data submission from the resident, through the resident media device. The controlled-environment facility management system may also instruct the resident media device to restrict access, until the resident submits the additional data, and the resident media device may restrict such access in response to these instructions from the controlled-environment facility management system.

In accordance with other embodiments of the present systems and methods, controlled-environment facility resident data collection systems and methods also employ a controlled-environment facility management system and resident media devices. The controlled-environment facility management system may present at least one resident of the controlled-environment facility a form, or the like, on a resident media device to be completed by the resident using the resident media device. The resident media device may present the form to the resident to enter information details on the device. The controlled-environment facility management system may instruct the resident media device to restrict access by the resident to entry of data in the form, until the resident completes the form and submits the form to the controlled-environment facility management system. The resident media device may restrict access in response to these instructions from the controlled-environment facility management system to access to the form, until the resident completes the form and submits the form to the controlled-environment facility management system. In response to the resident submitting initial data, the controlled-environment facility management system may request further data from the resident through the resident media device. In such cases the controlled-environment facility management system may again restrict access to the resident media device to submission of the further data, until the resident completes submission of the further data.

In any such embodiments, the controlled-environment facility may be a correctional facility and the resident an inmate. Also, in various embodiments form documents used may include healthcare forms, grievance requests, kites, or the like. In the case of a medical appointment request form, or the like, a resident may only be allowed to submit a single medical appointment request, in accordance with embodiments of the present systems and methods.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
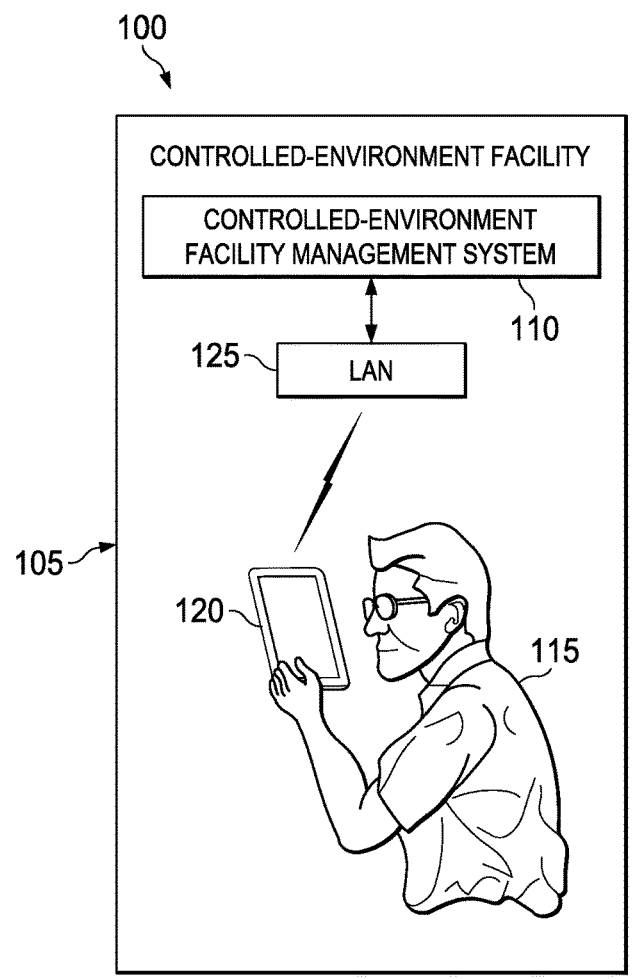
Figure 2:
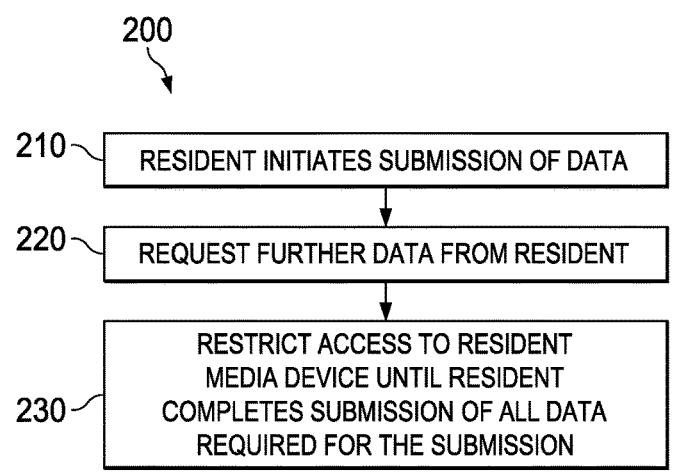
Figure 3:
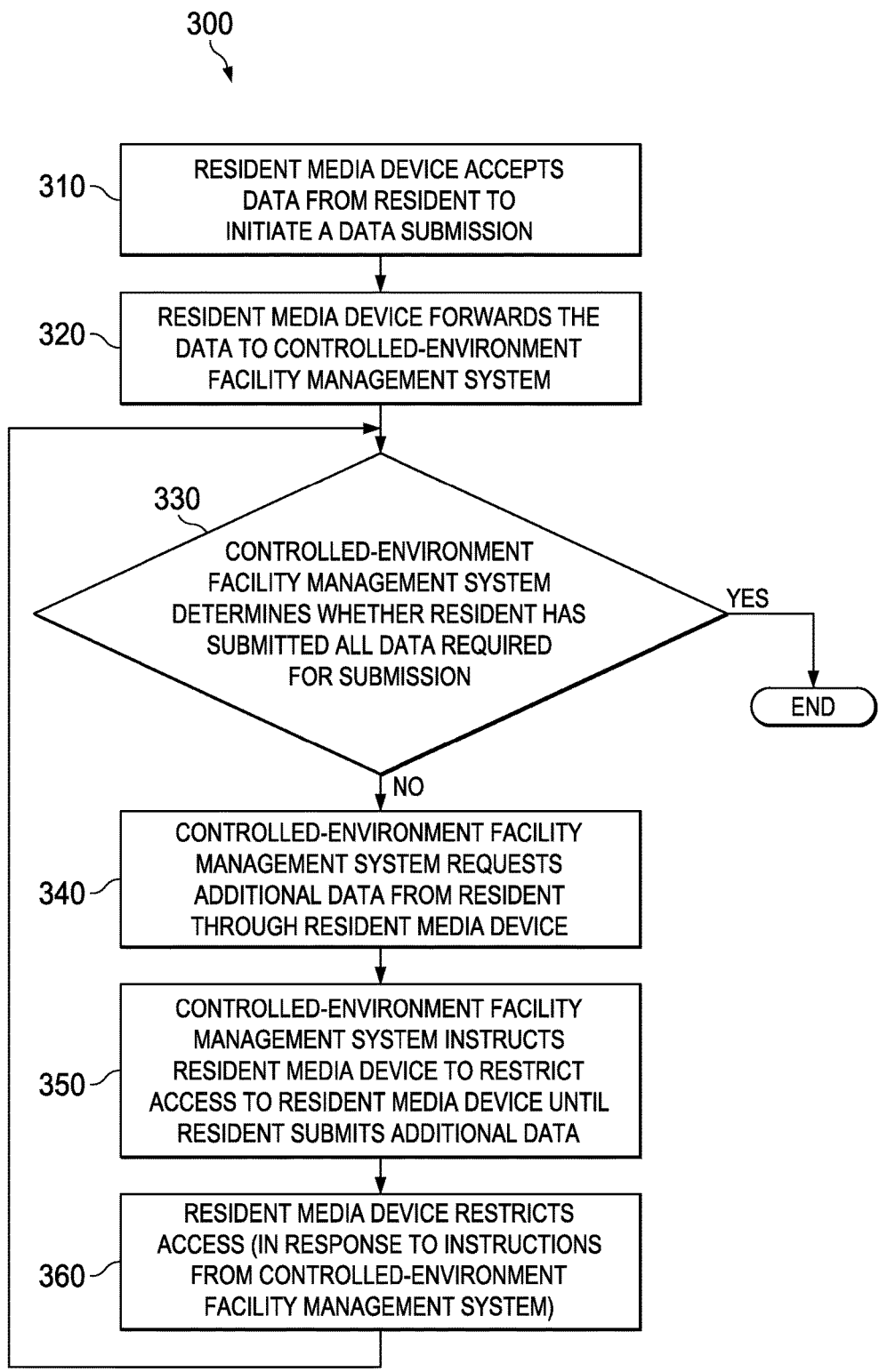
Figure 4:
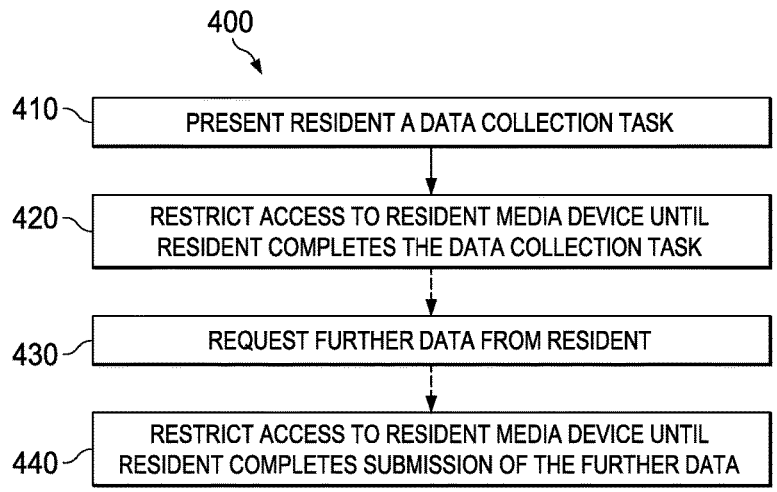
Figure 6:
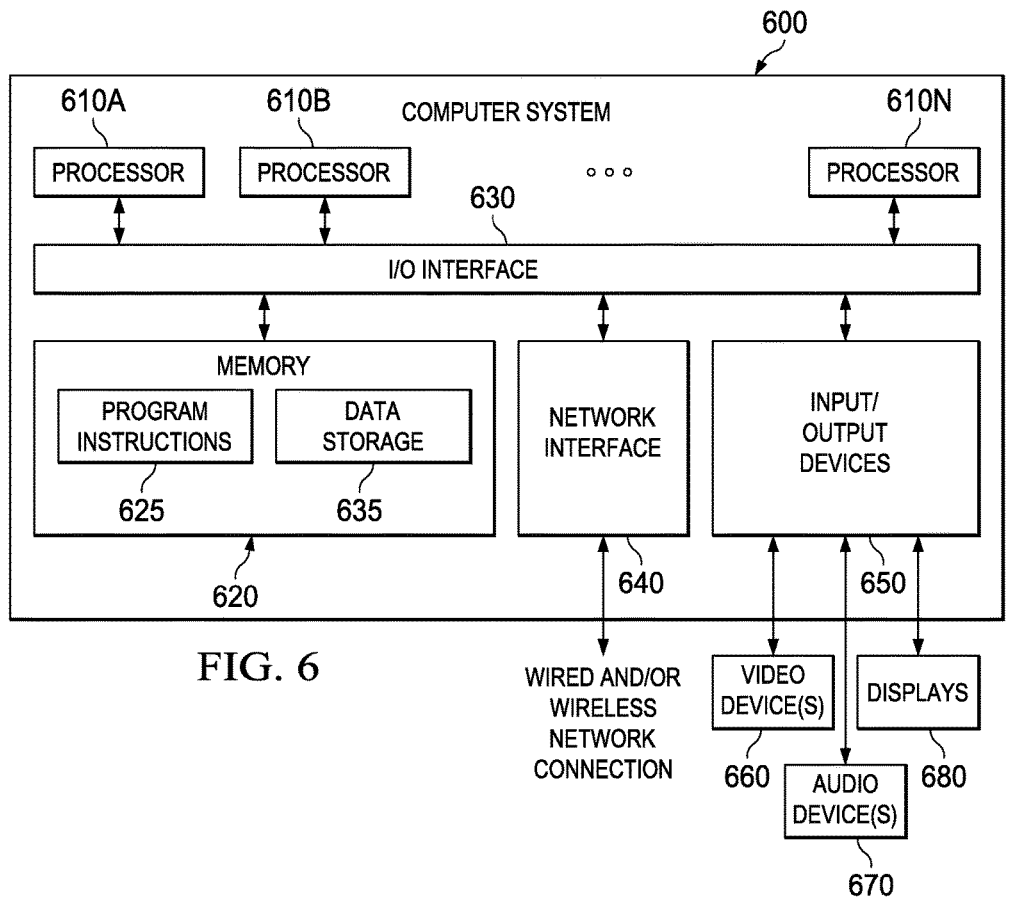
Figure 5:
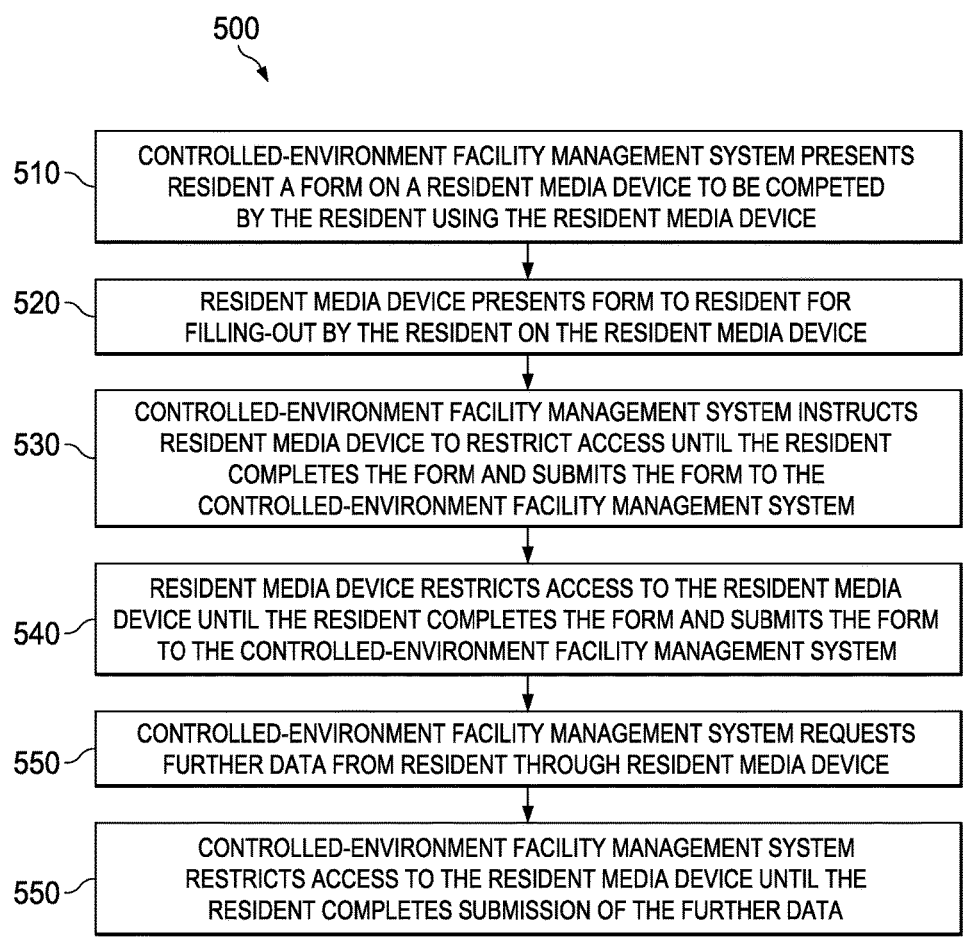

Having thus described the invention in general terms, reference will now be made to the accompanying drawings, which are not necessarily drawn to scale, and wherein:

FIG. 1 is a diagrammatic environmental view showing deployment of a controlled-environment facility resident data collection system with respect to a controlled environment facility, in accordance with some embodiments;

FIG. 2 is a flowchart of an example implementation of a process for controlled-environment facility resident data collection initiated by a resident of the controlled-environment facility, in accordance with some embodiments;

FIG. 3 is a flowchart of a more specific implementation of a process for controlled-environment facility resident data collection initiated by a resident of the controlled-environment facility, in accordance with some embodiments;

FIG. 4 is a flowchart of an example implementation of a process for controlled-environment facility resident data collection commencing from the controlled-environment facility, in accordance with some embodiments;

FIG. 5 is a flowchart of a more specific example implementation of a process for controlled-environment facility resident data collection commencing from the controlled-environment facility, in accordance with some embodiments; and FIG. 6 is a block diagram of a computer system, device, station, or terminal configured to implement various techniques disclosed herein, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. Correctional facilities, in particular, present numerous difficulties in areas such as security, surveillance, financial transactions, communications, visitation, investigation, budgetary, etc.; which in turn make technological implementations uniquely challenging in those environments. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. In many cases, technologies that are used outside of correctional facilities are not immediately applicable to the correctional environment without significant changes and modifications. Moreover, correctional facilities may have specific needs that are not particularly relevant outside of those environments. However, it should be understood, that the systems and methods described herein may be similarly applicable to other types of controlled-environment facilities and their respective residents (e.g., a hospital and its patients, a school (dormitory) and its students, etc.).

Embodiments of the present systems and methods for compelling data collection, via resident media devices, in controlled-environment facilities use resident media devices in controlled-environment facilities for completion of data collection through inclusion of residents in workflow data collection through controlled use of resident tablet devices. For example, as noted, many forms, processes, and the like are resident initiated. Form documents may include healthcare forms, grievance requests, kites, or the like. In some controlled-environment facilities, initiation of such forms, and entry of data in such forms may employ electronic means, such as resident accessible computers, tablet computing devices, media players, kiosks, telephones, video devices, or the like. Hence, in accordance with various embodiments of the present systems and methods, a controlled environment facility resident may initiate submission of data to a controlled-environment facility management system using a resident media device, and some time thereafter, access to the resident media device may be restricted by the controlled-environment facility management system to submission of data, until the resident completes submission of all data required for the submission. In the case of a medical appointment request form, or the like, a resident may only be allowed to submit a single medical appointment request. In accordance with various other embodiments of the present systems and methods, a controlled-environment facility management system may present a controlled-environment facility resident a data collection task to be completed by the resident using the resident media device and may restrict access to the resident media device to submission of the data, until the resident completes the data collection task. The controlled-environment facility management system may also request further data from the resident, in response to the resident submitting initial data and may again restrict access to the resident media device to submission of further data, until the resident completes submission of further data.

In some correctional facilities (some) inmates have the privilege of use of a resident media device such as a tablet computing device, media player, kiosk, telephone video device, or the like, which may be specially adapted for use in the/a correctional facility, and/or may otherwise be approved for use in the correctional facility. Hence, a controlled-environment facility management system, or the like, may have more control over the resident media device than is typical for outside tablet computing device, media players, telephones, video devices, or the like. Thus, in accordance with embodiments of the present systems and methods, the privilege of use of such resident media devices and this control over the device is leveraged to compel data collection from the resident in various controlled-environments, through automated restriction upon the use of the device, other than to complete submission of the data being collected. Such restriction may be escalating in nature, beginning with warnings and progressing to lock-out of particular features or application programs (apps), until the data is submitted. Ultimately, the resident may be locked-out of any device functionality, other than completion of the form, or the like, used to submit the data. In particular implementations, this lock-out may be fully implemented from the initial request in order to spur a response from the resident as soon as possible.

FIG. 1 is a diagrammatic environmental view showing deployment of controlled-environment facility resident data collection system 100 with respect to controlled environment facility 105, in accordance with some embodiments. Controlled-environment facility resident data collection system 100 includes controlled-environment facility management system 110, or the like, which may be comprised of one or more computer systems, and which may be collocated with controlled-environment facility 105, as illustrated. Alternatively, one or more computer systems comprising controlled-environment facility management system 110 may be located remote with respect to controlled-environment facility 105, in a centralized, or decentralized manner. Further, functionalities of controlled-environment facility management system 110 may be distributed to computer systems located inside, adjacent to, and/or outside of controlled-environment facility 105. In accordance with embodiments of the present systems and methods, one or more of residents 115 of controlled-environment facility 105 may be provided with a resident media device 120. For example, in accordance with various embodiments of the present systems and methods, controlled-environment facility resident media device 120 may be a tablet computing device, media player, personal computer, network terminal, kiosk, telephone, video device, or the like, adapted and/or approved for use by residents of the controlled-environment facility (within the controlled-environment facility). Resident media device(s) 120 may communicate with controlled-environment facility management system via a (wired or wireless) Local Area Network (LAN (WLAN)) 125 or the like.

Each resident media device 120 may be particularly adapted for use in a controlled-environment. For example, in a correctional institution, jail, or the like, such a resident media device may have a specially adapted operating system and/or may be "stripped-down," particularly from the standpoint of what applications programs (apps) and/or hardware are provided or allowed on resident media device 120, and/or connectivity afforded such a resident media device. For example, a resident media device may employ an operating system kernel based upon an open source platform such as the CyanogenMod ANDROID™-based operating system, which may be rebuilt for use in such a resident media device in a controlled-environment facility. In such an example, the resident media device may be adapted to only connect to network 125, or other network provided by the controlled-environment facility. Also, the resident media device may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on resident media devices might include apps of particular interest to residents of the controlled-environment facility. For example, resident media devices provided to inmates of correctional facilities, might include apps that may be of particular use to an inmate, in general, such as access to a legal research service, or of more specific interest, such as providing an inmate nearing release, access to employment searching apps or the like. Hence, such inmate resident media devices may be used to help soon to be released inmates transition. For example, the resident media device may be used to communicate with a future employer, or the like. As such, resident media devices may be sponsored, or otherwise subsidized by organizations or companies, assisting with the transition of inmates into society.

As noted the resident media device may be a kiosk, telephone, videophone or the like. As but one example, a telephone/videophone terminal, which may be referred to as an intelligent facility device is a replacement for typical phones provided in controlled-environment facilities, such as rehabilitation centers, jails and prisons, utilizing existing facility telephony wiring. Such a telephone/videophone terminal may take the form of a kiosk-type terminal or a hardened, wall mounted device. The intelligent facility device replaces a typical pay phone found in some facilities and may provide touch screen computer functionality that enables a resident to perform "self service" tasks such as setting up doctor appointments, scheduling visitation, viewing schedules, and checking the status of his or her case. The intelligent facility device may include an RFID reader, or the like to enable precise identification of each resident. In addition, the intelligent facility device may include a built-in camera and telephone handset to enable a resident to use video conferencing to meet face to face with attorneys, family and friends. Further intelligent facility device embodiments may resemble wall-mounted (hardened) tablet computing devices, which may be specially adapted for use in the controlled-environment facility similar to resident media devices described above.

In accordance with embodiments of the present systems and methods, services may be incorporated into core capabilities of the resident media device so as to allow individual services to post needs for data collection from the resident the media device is associated with. The resident media device running the present device lock-out service may then prompt the resident for the requested data, with an optional ability to preclude the resident from using other services of the device, until the resident has provided the requested information and/or responses. Answering or inputting information may be anything from filling out important documentation regarding a witnessed incident to filling out a specific survey. Other important embodiments may relate to resident healthcare, wherein residents may be required to fill out a form regarding current symptoms or general health within a specific timeframe. If the request is not complete in the specific time frame, embodiments of the present systems and methods could render the resident media device useless to the resident.

In accordance with some embodiments of the present systems and methods, wherein controlled-environment facility resident data collection system 100 again includes at least one controlled-environment facility resident media device (120) and controlled-environment facility management system 110, a respective resident media device 120 may accept data from a respective controlled-environment facility resident (115) to initiate a data submission to controlled-environment facility management system 110 by resident 115. Resident media device 120 may forward the data to controlled-environment facility management system 110, such as via LAN 125 (wirelessly or wired). Whereupon a determination may be made, such as by controlled-environment facility management system 110 as to whether resident 115 has submitted all data required for the data submission. If it is determined that additional data is needed to complete the data submission, controlled-environment facility management system 110 may request additional data needed to complete the data submission from resident 115, through resident media device 120. In furtherance of such data collection, particularly when a given time has passed, controlled-environment facility management system 110 may instruct resident media device 120 to restrict access to itself, or resident media device may itself restrict access, until resident 115 submits the additional data, such as through use of resident media device 120. As a result, resident media device 120 may restrict access to itself (in response to instructions from controlled-environment facility management system 110), escalating over time, up to only allowing access to submit the additional data.

In accordance with some other embodiments of the present systems and methods, controlled-environment facility management system 110 may present at least one resident (115) of controlled-environment facility 105, on a respective resident media device 120, a form document to be completed by resident 115 using resident media device 120. Correspondingly, in accordance with such embodiments of the present systems and methods, each resident media device (120) may present the form document to the respective resident (115) for entry of data by resident 115 on resident media device 120. Over time, controlled-environment facility management system 110 may also instruct resident media device 120 to restrict access by resident 115 to resident media device 120, escalating, such as up to only allowing entry of data in the form document on resident media device 120, until resident 115 completes the form document using resident media device 120 and submits the form document to controlled-environment facility management system 110, such as via LAN 125 (wirelessly or wired). Further, in concert with such embodiments, resident media device 120 may restrict access to itself, in response to instructions from controlled-environment facility management system 110, up to, over time, only allowing access to the form document, until resident 115 completes the form document using resident media device 120 and submits the form document to controlled-environment facility management system 110, such as via LAN 125 (wirelessly wired). Further, in accordance with such embodiments, controlled-environment facility management system 110 may request further data from resident 115, such as in response to the respective resident submitting initial data using resident media device 120 and controlled-environment facility management system 110 may also restrict access to resident media device 120, at some time, to only allow submission of the further data, until resident 115 completes submission of the further data using resident media device 120.

FIG. 2 is a flowchart of example implementation 200 of a process for controlled-environment facility resident data collection initiated by a resident of the controlled-environment facility, in accordance with some embodiments. In accordance with such implementations of the present systems and methods a controlled environment facility resident (115) initiates submission of data to a controlled-environment facility management system (110) using a resident media device (120), at 210. This initiation of submission of data to the controlled-environment facility management system by the resident may include filling-out at least a portion of a form document by the resident and submitting the resulting at least partially filed-out form document to the controlled-environment facility management system. In response to initiating submission of data by the resident at 210, the controlled environment facility management system may request further data from the resident at 220. Access to the resident media device may be restricted at 230 by the controlled-environment facility management system, and/or by the resident media device itself, to submission of the data, until the resident completes submission of all data required for the submission. For example, access to the resident media device may be restricted by the controlled-environment facility management system, and/or by the resident media device itself, in an escalating manner up to only entry of data in the form document, until the resident submits a completed copy of the form document to the controlled-environment facility management system.

In such embodiments the form document may be a commissary order form, such as a commissary order form initiated by a resident, but which was not completed. For example, in accordance with embodiments of the present systems and methods, if a resident has initiated filling-out of a commissary order form, and has not completed the process, as a deadline, or the like, approaches, the resident may be spurred to complete (or cancel) the order through implementation of the present systems and methods for compelling data collection. In another example, the resident may think that the order is complete, and implementation of the present systems and methods may impress on the resident that the order is not yet complete in a better manner than mere reminder notices, or the like.

FIG. 3 is a flowchart of more specific implementation 300 of a process for controlled-environment facility resident data collection initiated by a resident of the controlled-environment facility, in accordance with some embodiments. Therein, in accordance with embodiments of the present systems and methods, a controlled-environment facility resident media device (120) accepts data from a controlled-environment facility resident (115) at 310 to initiate a data submission to a controlled-environment facility management system (110) by the resident. This data submission may be embodied by a form document being filled out by the resident, in various embodiments such form documents may include healthcare forms, grievance requests, kites, or the like. In the case of a medical appointment request form, or the like, a resident may only be allowed to submit a single medical appointment request to prevent a resident (such as an inmate in a correctional facility environment) from abusing the system by requesting multiple appointments. At 320 the resident media device forwards the data to the controlled-environment facility management system (such as via (W)LAN 125). At 330, the controlled-environment facility management system may determine whether the resident has submitted all data required for the data submission at 320. In response to a determination at 330 that additional data is needed to complete the data submission, the controlled-environment facility management system may request additional data needed to complete the data submission from the resident, at 340, through the resident media device. Also, at some time after the request at 340, the controlled-environment facility management system may, at 350, instruct the resident media device to restrict access to the resident media device, until the resident submits the additional data, such as through use of the resident media device. Accordingly, at 360 the resident media device may restrict access to the resident media device, on its own or, in response to instructions from the controlled-environment facility management system issued at 350. Steps 330 through 360 may repeat, until a determination is made at 330 that the resident has submitted all required data.

Restriction of access to the resident media device may be escalating in nature, beginning with warnings and progressing to lock-out of particular features or application programs (apps), until the data is submitted. For example, prior to restricting access to the resident media device to only access to the form, the resident may be warned, through the resident media device, that access to the resident media device will be restricted unless the resident completes the form and submits the data. After warning the resident, but prior to restricting access to the resident media device to only access to the form, access to a subset of functionality of the resident media device may be restricted, until the resident submits the required data. After such restricting of access to the resident media device to a subset of functionality of the resident media device, but prior to restricting access to the resident media device to only access to the form, access to the resident media device may be restricted to an even smaller subset of functionality of the resident media device, until the resident completes the submission. Thereby, ultimately, the resident may be locked-out of any device functionality, other than completion of the form, or the like used to submit the data. However, in particular implementations, this lock-out may be fully implemented from the initial request in order to spur a response from the resident as soon as possible.

FIG. 4 is a flowchart of an example implementation 400 of a process for controlled-environment facility resident data collection commencing from the controlled-environment facility, in accordance with some embodiments. In accordance with such implementations of the present systems and methods, a controlled-environment facility resident (115) is presented a data collection task at 410. This task may be presented on a resident media device (120), to be completed by the resident using this resident media device. This data collection task, by way of example, may be entry of data in a form document on the resident media device, and may be made by a controlled-environment facility management system (110) transmitting the form document to the resident media device (such as via (W)LAN 125) with a request that the resident fill out at least portions of the form document. At 420, sometime after the request at 410, access to the resident media device is restricted to submission of the data (in an escalating manner), until the resident completes the data collection task, which may be accomplished using the resident media device. For example, the computer system may restrict access to the resident media device to entry of data in the form document, until the resident submits a completed copy of the form document to the computer system (using the resident media device). At 430, in accordance with some embodiments of the present systems and methods, the controlled-environment facility management system may request further data from the resident, such as in response to the resident submitting initial (or incomplete) data. The controlled-environment facility management system may restrict access to the resident media device (in an escalating manner) to submission of the further data at 440, until the resident completes submission of the further data (using the resident media device).

In accordance with some embodiments of the present systems and methods, responding to an inquiry for data may be rewarded, providing facility staff, or others, a means to reach-out to residents. For example, if the data request is in the nature of a survey, or the like, the resident may be rewarded for answering the survey. In a commissary-related example, answering the survey may result in the resident receiving a commissary credit, or the like, while in a communication service-related example the resident may receive credit, communication time, a trial use of a particular communications service, or the like, for completing the survey.

In accordance with embodiments of the present systems and methods, the completion of required data may be relatively minimal. As a correction facility environment example, a rule change notice may be issued to residents through resident media devices and acknowledgment of the rule change may be required to prevent lock-out of the device. In other examples, embodiments of the present systems and methods may be employed for behavior modification (i.e. the lock-out may be used as a means of punishment, or removal of an existing lock-out may be used as a reward, for certain behavior).

FIG. 5 is a flowchart of more specific example implementation 500 of a process for controlled-environment facility resident data collection commencing from the controlled-environment facility, in accordance with some embodiments. In accordance with such implementations of the present systems and methods, at 510, a controlled-environment facility management system (110) presents at least one resident (115) of the controlled-environment facility (105) a form document, on a resident media device (120), to be completed by the resident, using the resident media device. At 520 the resident media device presents the form document to the resident for filling-out by the resident on the resident media device. At 530, some time after presentation of the form document to the resident at 510 and 520, the controlled-environment facility management system may instruct the resident media device to restrict access by the resident to the media device. This restriction may be up to only allowing entry of data in the form document on the media device, until the resident completes the form document and submits the form document to the controlled-environment facility management system, which may be accomplished using the media device. At 540, in response to the instructions from the controlled-environment facility management system, the resident media device restricts access to the resident media device to access to the form document, until the resident completes the form document (using the resident media device) and submits the form document to the controlled-environment facility management system (employing the resident media device). At 550 the controlled-environment facility management system may request further data from the resident through the resident media device, such as in response to the resident submitting initial data using the resident media device. At 560 the controlled-environment facility management system may restrict access to the resident media device to submission of the further data, until the resident completes submission of the further data, such as through use of the resident media device.

Again, access to the resident media device may be restricted in an escalating manner, beginning with warnings and progressing to lock-out of particular features or application programs (apps), until the data is submitted. For example, prior to restricting access to the resident media device to only access to the form, the resident may be warned, through the resident media device, that access to the resident media device will be restricted unless the resident completes the form and submits the data. Thereafter, access to the resident media device may be restricted to an even smaller subsets of functionality of the resident media device, until the resident completes the submission, ultimately locking the resident out of any device functionality, other than completion of the form. As noted, in particular implementations, this lock-out may be fully implemented from the initial request in order to spur a response from the resident as soon as possible.

In a medical environment, such as a hospital, embodiments of the present systems and methods may be used to complete electronic check-in of patients, for checking progress of patients, or the like. For example, the patient may be sent a questionnaire concerning treatment, pain or the like to a resident media device. Successful completion of the form may result in the elimination of need for a nurse or administrator visit, and permit use of the resident media device for entertainment purposes or the like. In medical-related implementations, the present systems and methods may also be used to help validate and/or promote rehabilitation, such as eye-hand coordination, freedom of movement, or the like. For example, the data gathered may be in the form of a tactile exercise using a touch screen of the resident media device. In another example, the resident media device may be mounted on a wall or the like, requiring the resident to get-up and walk to the device to respond to a request. In an educational environment, embodiments of the present systems and methods, may permit a teacher to lock-out a student's media device, until the student submits required work (data), or the like.

Embodiments of the present systems and methods for compelling data collection via resident media devices in controlled-environment facilities, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, media player, kiosk, telephone, video device, or the like. For example, in some cases, computer 600 may implement one or more steps of example processes 200, 300, 400 and/or 500 described above with respect to FIGS. 2 through 5, and/or a computer system such as computer system 600 may be used as, or as part of, one or more of controlled environment facility management system 110, resident media device 120, and/or the like. In various embodiments two or more of these computer systems may be configured to communicate with each other in any suitable way, such as, for example, via a network. For example, in FIG. 1, resident media device 120 is illustrated as wirelessly communicating with controlled-environment facility management system 110, such as via local area network 125, and/or using wireless functionality. Alternatively or additionally, resident media device may, in accordance with various embodiments of the present systems and methods, communicate with controlled-environment facility management system 110 via a wired network connection (i.e. an Ethernet-based LAN, or the like).

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method compelling data collection via resident media devices in controlled-environment facilities comprising:
    initiating by a controlled environment facility resident submission of data to a controlled-environment facility management system using a controlled-environment facility resident media device;
    determining the resident has not completed submission of all data required for the submission;
    warning the resident, by the controlled-environment facility management system and/or the resident media device, on the resident media device, that access to the resident media device will be restricted unless the resident completes submission of all data required for the submission;
    determining, after warning the resident that access to the resident media device will be restricted, the resident has not completed submission of all data required for the submission;
    restricting access to the resident media device, by the controlled-environment facility management system and/or the resident media device, to a subset of functionality of the resident media device;
    determining, after restricting access to the resident media device to the subset of functionality of the resident media device, the resident has not completed submission of all data required for the submission;
    restricting access to the resident media device, by the controlled-environment facility management system and/or the resident media device, to a smaller subset of functionality of the resident media device;
    determining, after restricting access to the resident media device to the smaller subset of functionality of the resident media device, the resident has not completed submission of all data required for the submission; and
    restricting access to the resident media device, by the controlled-environment facility management system and/or the resident media device, to submission of the data, until the resident completes submission of all data required for the submission.

2. The method of claim 1, wherein initiating submission of the data further comprises:
    filling-out at least a portion of a form document by the resident on the resident media device; and
    submitting the resulting at least partially filed-out form document to the controlled-environment facility management system.

3. The method of claim 2, further comprising warning the resident and restricting access to the resident media device, by the controlled-environment facility management system and/or the resident media device, until the resident submits a completed copy of the form document to the controlled-environment facility management system.

4. The method of claim 2, wherein the form is a healthcare form, a grievance request, or a kite.

5. The method of claim 1, wherein in response to initiating submission of data, the controlled environment facility management system requests further data from the resident, and the controlled-environment facility management system and/or the resident media device warns the resident and restricts access to the resident media device, until the resident completes submission of the further data required.

6. The method of claim 1, wherein the controlled-environment facility is a correctional facility and the resident is an inmate.

7. The method of claim 1, wherein the resident media device is a computing device adapted and/or approved for use in the controlled-environment facility.

8. The method of claim 7 wherein the computing device is a tablet computing device, media player, kiosk, telephone or video device.

9. A non-transitory computer-readable storage medium having program instructions stored thereon that, upon execution by one or more computer systems, cause the one or more computer systems to:
  present to a controlled-environment facility resident, on a controlled-environment facility resident media device, a data collection task to be completed by the resident using the resident media device;
  determine the resident has not completed the data collection task;
  warn the resident, on the resident media device, that access to the resident media device will be restricted unless the resident completes data collection task;
  determine, after warning the resident that access to the resident media device will be restricted, the resident has not completed the data collection task;
  restrict access to the resident media device to a subset of functionality of the resident media device;
  determine, after restricting access to the resident media device to the subset of functionality of the resident media device, the resident has not completed the data collection task;
  restrict access to the resident media device to a smaller subset of functionality of the resident media device;
  determine, after restricting access to the resident media device to the smaller subset of functionality of the resident media device, the resident has not completed the data collection task; and
  restrict access to the resident media device to submission of the data, until the resident completes the data collection task.

10. The non-transitory computer-readable storage medium of claim 9, wherein the data collection task is filling-out a form document on the resident media device.

11. The non-transitory computer-readable storage medium of claim 10, wherein the program instructions cause the one or more computer systems to warn the resident and restrict access to the resident media device, until the resident submits a completed copy of the form document to at least one of the one or more computer systems.

12. The non-transitory computer-readable storage medium of claim 10, wherein the form is a healthcare form, a grievance request, or a kite.

13. The non-transitory computer-readable storage medium of claim 9, wherein the program instructions cause the one or more computer systems to request further data from the resident, via the resident media device, in response to the resident submitting initial data, and the program instructions cause the one or more computer systems to warn the resident and restrict access to the resident media device, until the resident completes submission of the further data.

14. The non-transitory computer-readable storage medium of claim 9, wherein the resident media device is a computing device adapted and/or approved for use in the controlled-environment facility, and the one or more computer systems comprise a controlled-environment facility management system and/or the resident media device.

15. The non-transitory computer-readable storage medium of claim 14, wherein the computing device is a tablet computing device, media player, kiosk, telephone or video device.

16. The non-transitory computer-readable storage medium of claim 9, wherein the controlled-environment facility is a correctional facility and the resident is an inmate.

17. A controlled-environment facility resident data collection system comprising:
  a controlled-environment facility management system; and
  at least one controlled-environment facility resident media device, at least one of the resident media devices comprising a computing device adapted and/or approved for use in the controlled-environment facility;
  the controlled-environment facility management system having:
    at least one processor; and
    a memory coupled to the at least one processor, the memory configured to store program instructions executable by the at least one processor of the controlled-environment facility management system to cause the controlled-environment facility management system to:
      present at least one respective resident of the controlled-environment facility, on a respective one of the resident media devices, a form to be completed by the respective resident using the respective resident media device; and
      instruct the respective resident media device to restrict access by the respective resident to the respective resident media device to entry of data in the form on the respective media device, until the respective resident completes the form and submits the form to the controlled-environment facility management system; and
  each of the at least one resident media devices having:
    at least one processor; and
    a memory coupled to the at least one processor, the memory configured to store program instructions executable by the at least one processor of the respective resident media device to cause the respective resident media device to:
      present the form to the respective resident for entry of data in by the respective resident on the respective resident media device; and
      restrict access by the respective resident to the respective resident media device, in response to instructions from the controlled-environment facility management system, to access to the form, until the respective resident completes the form and submits the form to the controlled-environment facility management system.

18. The controlled-environment facility resident data collection system of claim 17, wherein the program instructions executable by the at least one processor of the controlled-environment facility management system and/or the respective resident media device to further cause the controlled-environment facility management system and/or the respective media device to:

prior to restricting access to the respective resident media device to only access to the form and if the respective resident has not completed the form and submitted it to the controlled-environment facility management system, warn the respective resident, on the respective resident media device, that access to the respective resident media device will be restricted unless the respective resident completes the form and submits the form to the controlled-environment facility management system;

after warning the respective resident that access to the respective resident media device will be restricted and prior to restricting access to the respective resident media device to only access to the form, if the respective resident has not completed the form and submitted it to the controlled-environment facility management system, restrict access to the respective resident media device to a subset of functionality of the respective resident media device, until the respective resident completes the form and submits the form to the controlled-environment facility management system; and after restricting access to the respective resident media device to a subset of functionality of the resident media device and prior to restricting access to the resident media device to only access to the form, if the respective resident has not completed the form and submitted it to the controlled-environment facility management system, restrict access to the respective resident media device to a smaller subset of functionality of the respective resident media device, until the respective resident completes the form and submits the form to the controlled-environment facility management system.

19. The controlled-environment facility resident data collection system of claim 17, wherein the program instructions executable by the at least one processor of the controlled-environment facility management system further cause the controlled-environment facility management system to:

request further data from the respective resident, in response to the respective resident submitting initial data using the respective resident media device; and restrict access to the respective resident media device to submission of the further data, until the respective resident completes submission of the further data.

20. The controlled-environment facility resident data collection system of claim 17, wherein the computing device is a tablet computing device, media player, kiosk, telephone or video device.

21. The controlled-environment facility resident data collection system of claim 17, wherein the form is a healthcare form, a grievance request, or a kite.

22. The controlled-environment facility resident data collection system of claim 17, wherein the controlled-environment facility is a correctional facility and the resident is an inmate.

23. A controlled-environment facility resident data collection system comprising:

at least one controlled-environment facility resident media device, at least one of the resident media devices comprising a computing device adapted and/or approved for use in the controlled-environment facility; and a controlled-environment facility management system;

each respective resident media device having:
at least one processor; and
a memory coupled to the at least one processor, the memory configured to store program instructions executable by the at least one processor to cause the respective resident media device to:

accept data from a respective controlled-environment facility resident to initiate a data submission to the controlled-environment facility management system by the respective resident;

forward the data to the controlled-environment facility management system; and restrict access by the respective resident to the respective resident media device in response to instructions from the controlled-environment facility management system; and the controlled-environment facility management system having:
at least one processor; and
a memory coupled to the at least one processor, the memory configured to store program instructions executable by the at least one processor to cause the controlled-environment facility management system to:

determine whether the respective resident has submitted all data required for the data submission;

request additional data needed to complete the data submission from the respective resident, through the respective resident media device, in response to a determination that additional data is needed to complete the data submission; and instruct the respective resident media device to restrict access by the respective resident to the respective resident media device, until the respective resident submits the additional data.

24. The controlled-environment facility resident data collection system of claim 23, wherein the program instructions executable by the at least one processor of the controlled-environment facility management system and/or the respective resident media device to further cause the controlled-environment facility management system and/or the respective media device to:

prior to restricting access to the respective resident media device and if the respective resident has submitted the additional data, warn the respective resident, on the respective resident media device, that access to the respective resident media device will be restricted unless the respective resident submits the additional data;

after warning the respective resident that access to the respective resident media device will be restricted and prior to restricting access to the respective resident media device, if the respective resident has not submitted the additional data, restrict access to the respective resident media device to a subset of functionality of the respective resident media device, until the respective resident submits the additional data; and after restricting access to the respective resident media device to a subset of functionality of the resident media device and prior to restricting access to the resident media device, if the respective resident has not submitted the additional data, restrict access to the respective resident media device to a smaller subset of functionality of the respective resident media device, until the respective resident submits the additional data.

25. The controlled-environment facility resident data collection system of claim 23, wherein the computing device is a tablet computing device, media player, kiosk, telephone or video device.

26. The controlled-environment facility resident data collection system of claim 23, wherein the data submission is a healthcare form, a grievance request, or a kite.

27. The controlled-environment facility resident data collection system of claim 23, wherein the controlled-environment facility is a correctional facility and the resident is an inmate.

\* \* \* \* \*